United States Patent [19]

Koba

[11] Patent Number: 5,165,701
[45] Date of Patent: Nov. 24, 1992

[54] MAGNETIC FLUID SEAL APPARATUS

[75] Inventor: Akihiko Koba, Kitakyushu, Japan

[73] Assignee: Nok Corporation, Tokyo, Japan

[21] Appl. No.: 834,116

[22] Filed: Feb. 12, 1992

[30] Foreign Application Priority Data

Feb. 12, 1991 [JP] Japan .................. 3-12085[U]

[51] Int. Cl.$^5$ ............................................. F16J 15/40
[52] U.S. Cl. ..................................... 277/80; 277/135; 384/133
[58] Field of Search ................... 277/80, 135; 384/133, 384/446

[56] References Cited

U.S. PATENT DOCUMENTS

| | | | |
|---|---|---|---|
| 4,445,696 | 5/1984 | Raj et al. | 277/80 |
| 4,526,380 | 7/1985 | Raj et al. | 277/80 |
| 4,527,802 | 7/1985 | Wilcock et al. | 277/80 |
| 4,681,328 | 7/1987 | Ritter et al. | 277/80 |
| 4,842,426 | 6/1989 | Furumura et al. | 277/80 |
| 5,047,392 | 9/1991 | Hed | 277/80 |
| 5,108,198 | 4/1992 | Nii et al. | 277/80 |

FOREIGN PATENT DOCUMENTS

| | | | |
|---|---|---|---|
| 58-68554 | 4/1983 | Japan . | |
| 0047566 | 3/1984 | Japan | 277/80 |

*Primary Examiner*—William A. Cuchlinski, Jr.
*Assistant Examiner*—Daniel G. DePumpo
*Attorney, Agent, or Firm*—Jacobson, Price, Holman & Stern

[57] ABSTRACT

A magnetic fluid seal apparatus adapted to prevent a magnetic fluid from being displaced along a shaft or housing during linear motion of the shaft. In the apparatus of the bore mounted type, a pole piece is hermetically fixed within a bore of the housing, while an associated inner ring is fitted over the shaft so as to form an annular magnetic gap in which the magnetic fluid is magnetically retained. The inner ring has an axial length smaller than that of the pole piece. Thus, a portion of the magnetic fluid is retained along the outer face of the inner ring, while the remainder of the fluid is retained along the inner face of the pole piece to form a film of magnetic fluid. The pole piece has an axial length equal to or greater than the travel of linear motion of the shaft so that the portion of magnetic fluid retained along the inner ring is in continuous, integrated fluid-to-fluid engagement with the film of magnetic fluid throughout the travel of the shaft. Various other embodiments, including a magnetic fluid seal apparatus of the shaft mounted type, are also disclosed.

9 Claims, 3 Drawing Sheets

MAGNETIC FLUID SEAL APPARATUS

BACKGROUND OF THE INVENTION

1. Field of the Invention

The present invention relates to a magnetic fluid seal apparatus for establishing a hermetic seal between relatively movable housing and shaft. The present invention is particularly useful in hermetically sealing a shaft extending between a vacuum and an atmospheric environment and arranged relatively for linear reciprocating movement.

2. Description of the Prior Art

Magnetic fluid seal apparatus have been used to provide hermetic seals around movable shafts. A magnetic fluid seal apparatus includes a magnetic fluid that contains ferromagnetic particles dispersed in a carrier liquid. The magnetic fluid is magnetically retained in an annular magnetic gap formed between the shaft and the housing. Where the magnetic fluid seal apparatus is used to seal a shaft which undergoes a reciprocating linear motion, a small quantity of the magnetic fluid tents to be dragged and undesirably displaced along the surface of the shaft or the housing, thereby resulting in the contamination of the vacuum environment, such as a vacuum chamber. Furthermore loss of the magnetic fluid due to displacement may eventually result in the failure of the sealing capability. The manner in which such undesirable displacement of the magnetic fluid takes place is schematically illustrated in FIG. 1 of Japanese Patent Kokai Publication No. 58-68554/1983.

In order to offset these disadvantages, the above-identified patent publication contemplates to reduce the surface wettability of the shaft and, to this end, proposes the use of a coating 6 of nonpolar polymer applied over the shaft 12 in combination with the use of a magnetic fluid 11 having a high surface tension, as shown in the first embodiment thereof illustrated in FIG. 2 of that publication. This solution, however, is not satisfactory because the reduced surface wettability causes the magnetic fluid to be repelled from the surface thereby permitting the release of the magnetic fluid. Therefore, that publication further provides a plurality of scraper blades 7 and 17 of elastomeric material, as shown in FIGS. 3 and 4 of the publication. However, the provision of the scraper blades is disadvantageous because the shaft is subjected to an increased frictional resistance so that the linear motion of the shaft is obstructed.

SUMMARY OF THE INVENTION

Accordingly, an object of the present invention is to provide an improved magnetic fluid seal apparatus.

Another object of the invention is to provide a magnetic fluid seal apparatus which is capable of effectively preventing the magnetic fluid from being displaced along the shaft or housing during the linear motion of the shaft.

A still another object of the invention is to provide a magnetic fluid seal apparatus having provision for positively confining the magnetic fluid in the magnetic gap.

A further object of the invention is to provide a magnetic fluid seal apparatus capable of preventing the displacement of the magnetic fluid, yet providing a reduced frictional resistance.

According to the invention, there is provided a magnetic fluid seal apparatus for establishing a hermetic seal between a housing and a shaft which are arranged for linear relative movement. The magnetic fluid seal apparatus includes a source of magnetic flux, such as an annular permanent magnet, and a first and a second annular pole piece associated therewith.

In one embodiment of the invention as applied to the magnetic fluid seal apparatus of the bore mounted type, the permanent magnet and the pole pieces are fixed within a bore of the housing. According to one feature of the invention, a magnetically permeable first ring, which has an axial length smaller than that of the first pole piece, is fixed around the shaft in such a manner as to closely face and cooperate with the first pole piece to form a radial magnetic gap in which a magnetic fluid is retained. As the axial length of the first ring is selected to be smaller than that of the associated first pole piece, the magnetic flux passing across the gap will flare out outwardly as viewed in the axial cross-section. As a result, while a radially inner portion of the mass of the magnetic fluid which is retained adjacent the outer face of the first ring is confined along the outer face of the first ring, the radially outer portion of the magnetic fluid mass retained adjacent the inner face of the first pole piece will be spread over the inner face of the first pole piece to form a film of magnetic fluid positively retained by the magnetic flux along the entire inner face of the first pole piece.

According to another feature of the invention, the first pole piece has an axial length which is equal to or greater than the travel of the linear movement that takes place relatively between the shaft and the housing. With this arrangement, the radially inner portion of the magnetic fluid retained adjacent the outer face of the first ring will be in continuous, inseparable, fluid-to-fluid contact with the film of magnetic fluid retained adjacent the inner face of the first pole piece throughout the travel of the linear movement. As the entire quantity of the magnetic fluid is confined in this manner in the path of the magnetic flux, the magnetic fluid will never be brought into direct contact with the moving surface of the shaft or the housing. Therefore, undesirable displacement of the magnetic fluid along the surface of the shaft or housing is entirely avoided.

In another embodiment of the invention as applied to the magnetic fluid seal apparatus of the shaft mounted type, the permanent magnet and the pole pieces are fixed around the shaft, with the magnetically permeable ring disposed within the bore of the housing. Similar to the first embodiment, the magnetically permeable ring has an axial length smaller than that of the pole piece, the latter being equal to or greater than the stroke of the linear motion between the shaft and the housing.

In both embodiments, a second ring of magnetically permeable material may preferably be provided so as to cooperate with the second pole piece to form a second magnetic fluid seal.

These features and advantages of the invention as well as other features and advantages thereof will become apparent when reading the following description in conjunction with the accompanying drawings.

BRIEF DESCRIPTION OF THE DRAWINGS

Throughout different drawings, similar parts and members will be indicated by like reference numerals.

DESCRIPTION OF THE PREFERRED EMBODIMENTS

Figure 1:
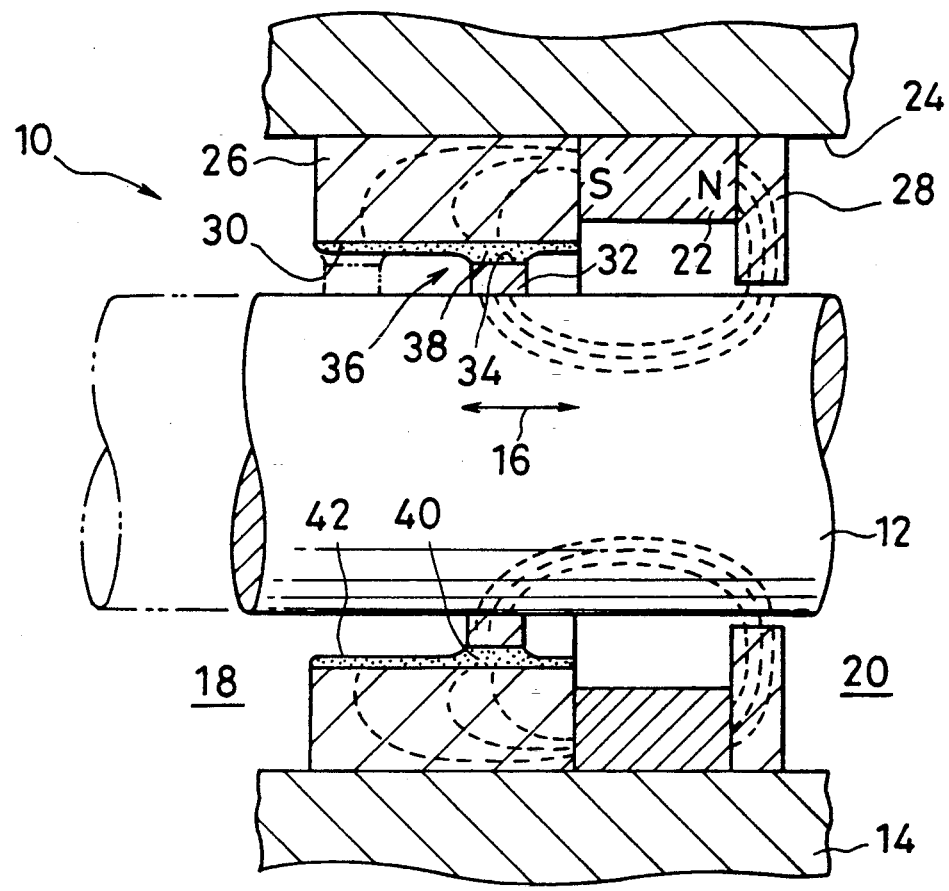
FIG. 1 is a fragmentary cross-sectional view showing the magnetic fluid seal apparatus of the bore mounted type according to the first embodiment of the invention as applied to a magnetically permeable shaft.

Referring to FIG. 1, there is shown a magnetic fluid seal apparatus according to the first embodiment of the invention. The magnetic fluid seal apparatus, indicated generally by the reference numeral 10, is shown as applied to a magnetically permeable shaft 12 which undergoes a linear reciprocating motion with respect to a housing 14 as shown by the arrow 16. Typically, the magnetic fluid seal apparatus 10 may be used to provide a hermetic seal between a subatmospheric environment 18 such as a vacuum chamber, not shown, and an atmospheric environment 20.

In the illustrated embodiment, the magnetic fluid seal apparatus 10 is of the bore mounted type and, to this end, a source of magnetic flux such as an axially polarized annular permanent magnet 22 is fixedly mounted within a bore 24 of the housing 14. Magnetically permeable, annular, first and second pole pieces 26 and 28 are press fitted within the bore 24 at both sides of the permanent magnet 22 in hermetically sealing engagement with the bore.

As shown, the first pole piece 26 has a cylindrical inner face 30 coaxial with and spaced from the shaft 12. The inner face 30 has an axial length equal to or greater than the travel of the reciprocating movement of the shaft 12.

The axial and radial dimensions of the second pole piece may be such that it closely faces the shaft 12 in a spaced relationship to form part of the magnetic flux circuit generated by the permanent magnet 22.

An annular ring 32 of magnetically permeable material is hermetically press fitted around the shaft 12. As shown, the axial length of the ring 32 is smaller than that of the first pole piece 26. The ring 32 is fixed to the shaft 12 at such an axial position that it is centered in the axial direction with the first pole piece 26 when the shaft 12 is situated at the middle of the travel of the linear reciprocating motion. The radial diameters of the outer face 34 of the ring 32 and of the inner face 30 of the pole piece 26 are so selected that a small radial gap 36 is formed therebetween. The magnetic flux generated by the permanent magnet 22 forms a closed magnetic circuit as schematically shown by the dotted lines.

A magnetic fluid 38 of the conventional composition is magnetically retained in the magnetic gap 36 to provide a hermetic seal between the first pole piece 26 and the ring 32. The radially inner portion 40 of the magnetic fluid 38 is retained along the outer face 34 of the ring 32. As the magnetic flux leaving the ring 32 is flared out outwardly toward the inner face 30 of the first pole piece 26, the remainder of the magnetic fluid 38 forms a continuous film 42 of magnetic fluid which uniformly covers and is retained along the inner face 30 of the first pole piece 26. The film 42 is also retained along the inner face 30 due to the surface wettability of the inner face 30.

As the shaft 12 performs a linear motion together with the ring 32 as shown by the phantom line, the inner portion 40 of the magnetic fluid 38 follows the linear movement of the ring because the density of the magnetic flux immediately leaving the ring 32 is relatively high, whereas the film 42 of the magnetic fluid remains rather static. During the linear motion, the inner portion 40 of the magnetic fluid is in continuous, integrated, intimate fluid-to-fluid contact with the film 42 of magnetic fluid. The inner portion 40 slides along the film 42 while keeping a coalesced relationship with the film 42. As the axial length of the first pole piece 26 is equal to or greater than the stroke of linear movement of the shaft 12 so that the inner portion 40 is constantly in contact with the film 42, a hermetic seal is established throughout the travel of linear motion. Since in this manner the magnetic fluid 38 is confined in the magnetic gap 36 and is kept out of contact with the shaft 12 or housing 14, it is possible to prevent the magnetic fluid from being dragged and displaced along the shaft or housing.

Figure 2:
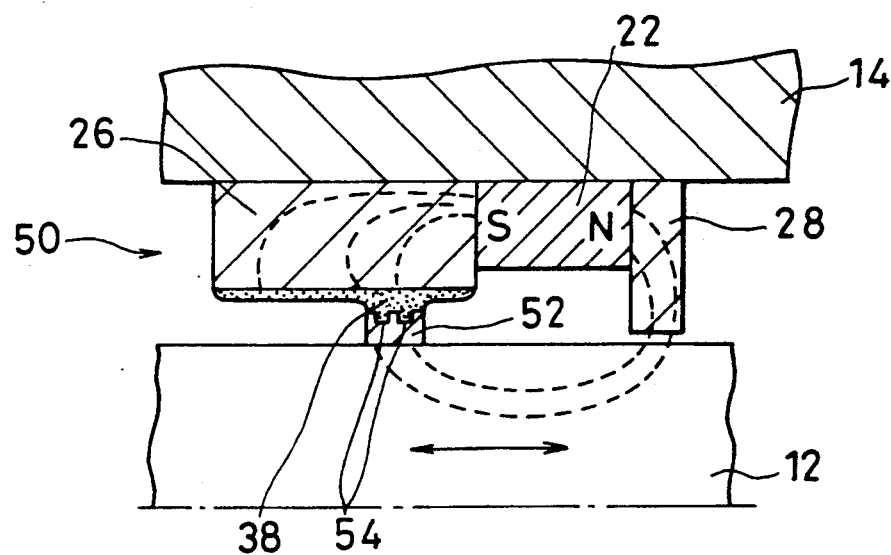
FIG. 2 is a fragmentary cross-sectional view showing the magnetic fluid seal apparatus of the bore mounted type according to the second embodiment of the invention, the lower half of various parts below the axis of the shaft being omitted for simplicity.

FIG. 2 illustrates a magnetic fluid seal apparatus according to the second embodiment of the invention. Parts and members similar to those of the first embodiment shown in FIG. 1 are indicated by like reference numerals and need to be described again. The magnetic fluid seal apparatus 50 includes an annular ring 52 of magnetically permeable material. The ring 52 is similar in function to the ring 32 of the first embodiment but differs therefrom in that a pair of annular grooves 54 are provided on the outer face of the ring 52. The annular grooves 54 serve to concentrate the magnetic flux passing across the outer face of the ring 52. The grooves 54 also function to positively retain the radially inner portion 40 of the magnetic fluid 38. As a result, the inner portion of the magnetic fluid is able to more quickly follow the movement of the shaft 12.

Figure 3:
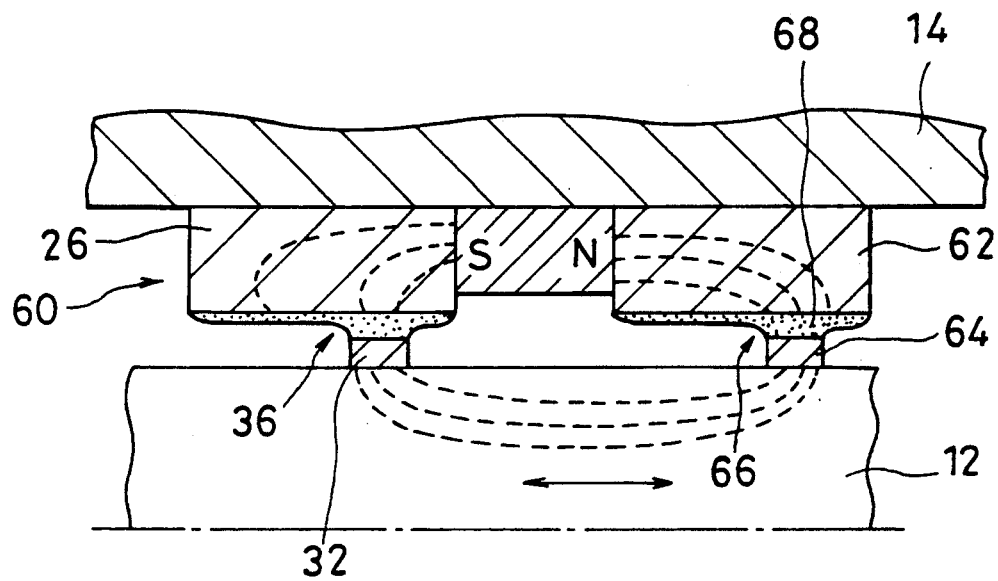
FIG. 3 is a fragmentary cross-sectional view showing the magnetic fluid seal apparatus of the bore mounted type according to the third embodiment of the invention, the lower half of various parts being similarly omitted.

FIG. 3 illustrates a magnetic fluid seal apparatus according to the third embodiment of the invention. Parts and members similar to those of the first embodiment shown in FIG. 1 are indicated by like reference numerals and will not be described again. Here also, the magnetic fluid seal apparatus 60 is adapted for use with the magnetically permeable shaft 12. In this embodiment, the magnetic fluid seal apparatus 60 is designed to perform hermetic seal in two stages. To this end, the second pole piece 62 has an axial length equal to or larger than the linear stroke of the shaft 12 and a second ring 64 of magnetically permeable material is press fitted over the shaft 12 to form a second magnetic gap 66 in which a second magnetic fluid 68 is retained. The second ring 64 and the second pole piece 62 function in the same manner as the first ring 32 and the first pole piece 26 so that sealing capability of the magnetic fluid seal apparatus is increased.

Figure 4:
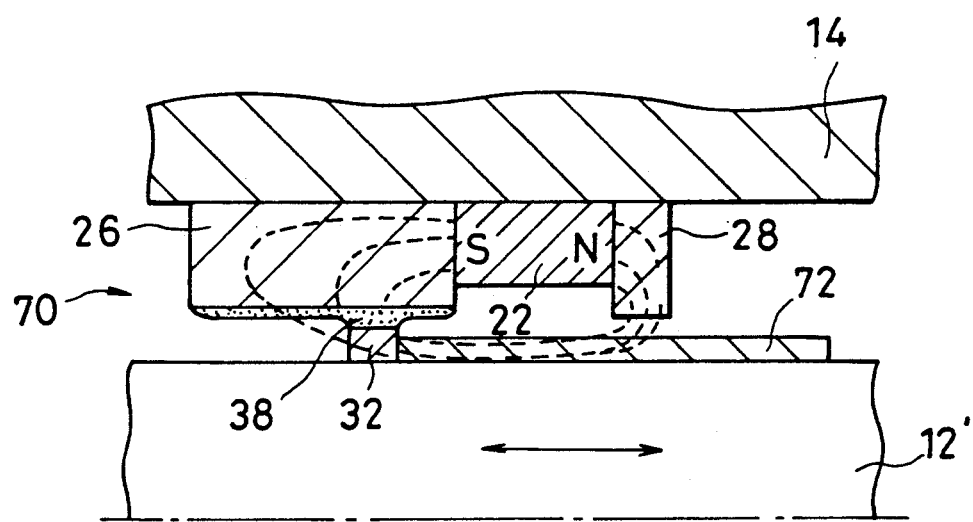
FIG. 4 is a fragmentary cross-sectional view showing the magnetic fluid seal apparatus of the bore mounted type according to the fourth embodiment of the invention as applied to a magnetically non-permeable shaft, the lower half of various parts being similarly omitted.

FIG. 4 illustrates a magnetic fluid seal apparatus according to the fourth embodiment of the invention. Parts and members similar to those of the first embodiment are indicated by like reference numerals and will not be described again. The magnetic fluid seal apparatus 70 shown is designed for use with a magnetically non-permeable shaft 12'. To this end, a sleeve 72 of magnetically permeable material is fitted over the shaft 12' contiguous to the first ring 32. The sleeve 72 is made long enough to ensure that the second pole piece 28 and the sleeve 72 is magnetically coupled with each other throughout the travel of the shaft 12'. Thus, a magnetic flux circuit is completed as shown by the dotted lines to magnetically retain the magnetic fluid 38 in the magnetic gap.

Figure 5:
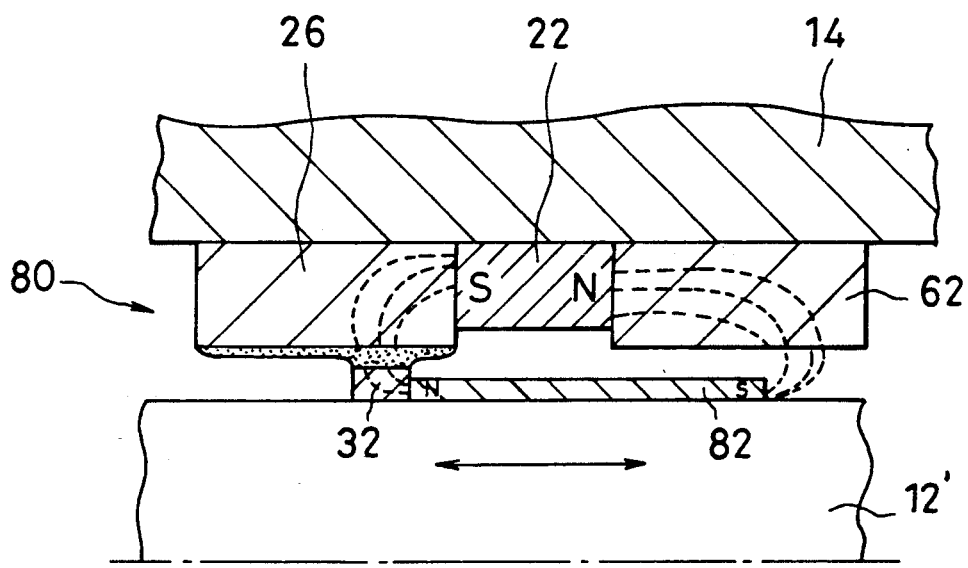
FIG. 5 is a fragmentary cross-sectional view showing the magnetic fluid seal apparatus of the bore mounted type according to the fifth embodiment of the invention as applied to a magnetically non-permeable shaft, the lower half of various parts being similarly omitted; and, FIG. 6 is a fragmentary cross-sectional view showing the magnetic fluid seal apparatus of the shaft mounted type according to the sixth embodiment of the invention, the lower half of various parts below the axis of the shaft being similarly omitted for simplicity.

FIG. 5 illustrates a magnetic fluid seal apparatus according to the fifth embodiment of the invention. Similar to the fourth embodiment, the magnetic fluid seal apparatus 80 shown is intended for use with a magnetically non-permeable shaft 12'. In place of the magnetically permeable sleeve 72 shown in FIG. 4, an elongated axially polarized second permanent magnet 82 is provided around the shaft 12'. The second magnet 82 has a polarity opposite to that of the first permanent magnet 22. Accordingly, the density of the magnetic flux of the circuit is increased whereby the magnetic fluid 38 is retained in the gap with increased magnetic force.

Figure 6:
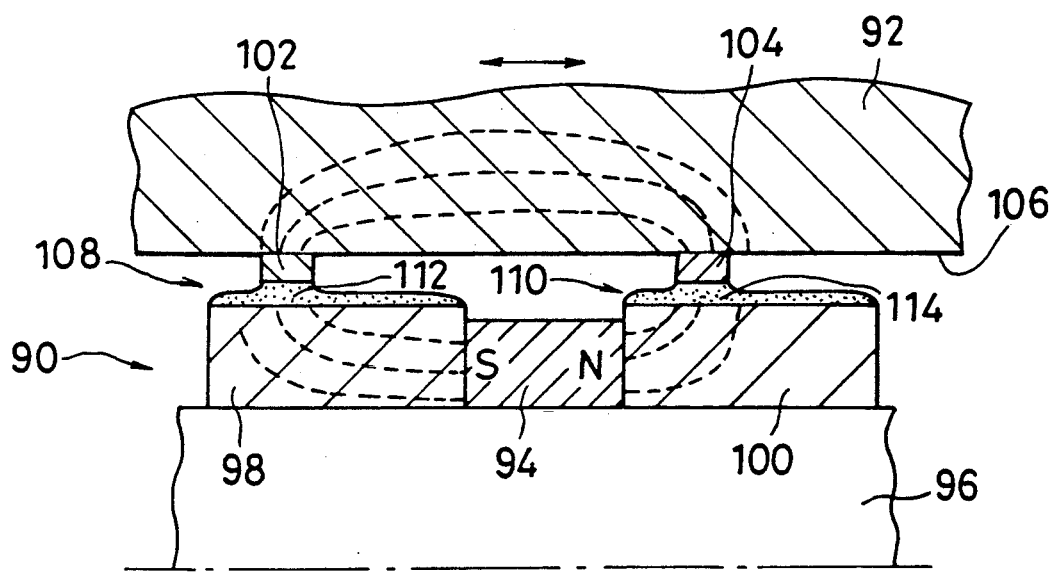

Referring to FIG. 6, there is shown a magnetic fluid seal apparatus according to the sixth embodiment of the invention. The magnetic fluid seal apparatus 90 is of the shaft mounted type and is designed to be used in conjunction with a magnetically permeable housing 92. The apparatus 90 has an axially polarized annular permanent magnet 94 fitted over the shaft 96 and sandwiched between magnetically permeable first and second pole pieces 98 and 100 which are hermetically press fitted over the shaft 96. Magnetically permeable first and second ring 102 and 104 are hermetically press fitted within a bore 106 of the housing 92 opposite the pole pieces 98 and 100. Similar to the arrangement shown in FIG. 3, the rings 102 and 104 have an axial length smaller than that of the pole pieces 98 and 100, the latter 98 and 100 having an axial length equal to or greater than the stroke of relative movement between the shaft 96 and the housing 92. The rings 102 and 104 cooperate, respectively, with the associated pole pieces 98 and 100 to form first and second magnetic gaps 108 and 110. Magnetic fluids 112 and 114 are retained in the gaps 108 and 110, respectively, to provide a pair of hermetic seals between the shaft 96 and the housing 92. The magnetic fluid seal apparatus 90 of this embodiment may be advantageously employed where the housing 92 undergoes linear reciprocating movement, because the apparatus 90 add little to the weight of the housing 92.

While the present invention has been described herein with reference to the specific embodiments thereof, it is contemplated that the invention is not limited thereby and various modifications and alterations may be made therein without departing from the scope of the invention. For example, in order to increase the surface area, the magnetically permeable annular rings may have a cross-section tapering radially outwardly in the case of the bore mounted type and tapering radially inwardly in the case of the shaft mounted type.

What is claimed is:

1. A magnetic fluid seal apparatus for establishing a hermetic seal between a housing and a magnetically permeable coaxial shaft which are arranged for linear relative movement, said apparatus comprising:

an annular magnetic element providing a source of magnetic flux and fixed within said housing;

first and second, magnetically permeable, annular pole pieces arranged within said housing at opposite sides of said magnetic element, each of said pole pieces having a cylindrical inner face coaxial with and spaced from said shaft, said first pole piece being fixed within said housing for hermetically sealing engagement therewith;

an annular, magnetically permeable, first ring fixed around said shaft for hermetically sealing engagement therewith, said ring having a cylindrical outer face closely facing in a noncontacting relationship with said inner face of said first pole piece to form therebetween a first small radial magnetic gap forming part of a magnetic flux path generated by said magnetic element, said outer face of said first ring having an axial length smaller than that of said inner face of said first pole piece; and, a first magnetic fluid retained magnetically in said first radial gap between said inner face of said first pole piece and said outer face of said first ring thereby to provide a first hermetic seal therebetween, a quantity of said first magnetic fluid being retained along said outer face of said first ring, the remainder of said first magnetic fluid being positively retained along said inner face of said first pole piece to form a continuous film of magnetic fluid throughout the axial length of said inner face of said first pole piece;

said inner face of said first pole piece having an axial length equal to or greater than the travel of linear relative movement between said housing and said shaft, whereby said quantity of magnetic fluid retained along said outer face of said first ring is in continuous, integrated fluid-to-fluid engagement with said film of magnetic fluid throughout the travel of said relative movement.

2. A magnetic fluid seal apparatus according to claim 1, wherein said first ring is fixed on said shaft at such an axial position that it is centered in the axial direction with said first pole piece when the shaft is situated at the middle of the travel of linear relative movement between said housing and said shaft.

3. A magnetic fluid seal apparatus according to claim 1, wherein said magnetic element comprises a permanent magnet.

4. A magnetic fluid seal apparatus according to claim 1, wherein an annular groove is formed on said outer face of said first ring.

5. A magnetic fluid seal apparatus according to claim 1, wherein said second pole piece is fixed within said housing for hermetically sealing engagement therewith, and wherein said apparatus further comprises; an annular, magnetically permeable, second ring fixed around said shaft for hermetically sealing engagement therewith, said second ring having a cylindrical outer face closely facing in a noncontacting relationship with said inner face of said second pole piece to form therebetween a second small radial magnetic gap forming part of the magnetic flux path generated by said magnetic element, said outer face of said second ring having an axial length smaller than that of said inner face of said second pole piece, and, a second magnetic fluid retained magnetically in second radial gap to provide a second hermetic seal between said inner face of said second pole piece and said outer face of said second ring, a quantity of said second magnetic fluid being retained along said outer face of said second ring, the remainder of said second magnetic fluid being positively retained along said inner face of said second pole piece to form a continuous film of magnetic fluid throughout the axial length of said inner face of said second pole piece, said inner face of said second pole piece having an axial length equal to or greater than the travel of linear relative movement between said housing and said shaft.

6. A magnetic fluid seal apparatus for establishing a hermetic seal between a housing and a magnetically non-permeable coaxial shaft which are arranged for linear relative movement, said apparatus comprising:

an annular magnetic element providing a source of magnetic flux and fixed within said housing;

first and second, magnetically permeable, annular pole pieces arranged within said housing at opposite sides of said magnetic element, each of said pole pieces having a cylindrical inner face coaxial with and spaced from said shaft, said first pole piece being fixed within said housing for hermetically sealing engagement therewith;

an annular, magnetically permeable ring fixed around said shaft for hermetically sealing engagement therewith, said ring having a cylindrical outer face closely facing in a noncontacting relationship with said inner face of said first pole piece to form therebetween a small radial magnetic gap forming part of a magnetic flux path generated by said magnetic element, said outer face of said ring having an axial length smaller than that of said inner face of said first pole piece;

a magnetically permeable sleeve fitted around said shaft contiguous to sad first ring to complete said magnetic flux path between said second pole piece and said first ring; and, a magnetic fluid retained magnetically in said radial gap between said inner face of said first pole piece and said outer face of said ring thereby to provide a hermetic seal therebetween, a quantity of said magnetic fluid being retained along said outer face of said ring, the remainder of said magnetic fluid being positively retained along said inner face of said first pole piece to form a continuous film of magnetic fluid throughout the axial length of said inner face of said first pole piece;

said inner face of said first pole piece having an axial length equal to or greater than the travel of linear relative movement between said housing and said shaft, whereby said quantity of magnetic fluid retained along said outer face of said ring is in continuous, integrated fluid-to-fluid engagement with said film of magnetic fluid throughout the travel of said relative movement.

7. A magnetic fluid seal apparatus for establishing a hermetic seal between a housing and a magnetically non-permeable coaxial shaft which are arranged for linear relative movement, said apparatus comprising:

a first annular magnetic element providing a source of magnetic flux and fixed within said housing;

first and second, magnetically permeable, annular pole pieces arranged within said housing at opposite sides of said magnetic element, each of said pole pieces having a cylindrical inner face coaxial with and spaced from said shaft, said first pole piece being fixed within said housing for hermetically sealing engagement therewith;

an annular, magnetically permeable ring fixed around said shaft for hermetically sealing engagement therewith, said ring having a cylindrical outer face closely facing in a noncontacting relationship with said inner face of said first pole piece to form therebetween a small radial magnetic gap forming part of a magnetic flux path generated by said first magnetic element, said outer face of said ring having an axial length smaller than that of said inner face of said first pole piece;

a second annular magnetic element fitted around said shaft contiguous to said ring in such a manner as to add to the magnetic flux between said second pole piece and said ring; and, a magnetic fluid retained magnetically in said radial gap between said inner face of said first pole piece and said outer face of said ring thereby to provide a hermetic seal therebetween, a quantity of said magnetic fluid being retained along said outer face of said ring, the remainder of said magnetic fluid being positively retained along said inner face of said first pole piece to form a continuous film of magnetic fluid throughout the axial length of said inner face of said first pole piece;

said inner face of said first pole piece having an axial length equal to or greater than the travel of linear relative movement between said housing and said shaft, whereby said quantity of magnetic fluid retained along said outer face of said ring is in continuous, integrated fluid-to-fluid engagement with said film of magnetic fluid throughout the travel of said relative movement.

8. A magnetic fluid seal apparatus for establishing a hermetic seal between a magnetically permeable housing and a coaxial shaft which are arranged for linear relative movement, said apparatus comprising:

an annular magnetic element providing a source of magnetic flux and fixed around said shaft;

first and second, magnetically permeable, annular pole pieces mounted around said shaft at opposite sides of said magnetic element, each of said pole pieces having a cylindrical outer face coaxial with and spaced from said housing, said first pole piece being mounted on said shaft for hermetically sealing engagement therewith;

an annular, magnetically permeable first ring fixed within said housing for hermetically sealing engagement therewith, said first ring having a cylindrical inner face closely facing in a noncontacting relationship with said outer face of said first pole piece to form therebetween a small first radial magnetic gap forming part of a magnetic flux path generated by said magnetic element, said inner face of said first ring having an axial length smaller than that of said outer face of said first pole piece; and, a first magnetic fluid retained magnetically in said first radial gap between said outer face of said first pole piece and said inner face of said first ring thereby to provide a hermetic seal therebetween, a quantity of said first magnetic fluid being retained along said inner face of said first ring, the remainder of said first magnetic fluid being positively retained along said outer face of said first pole piece to form a first film of magnetic fluid throughout the axial length of said outer face of said first pole piece;

said outer face of said first pole piece having an axial length equal to or greater than the travel of linear relative movement between said housing and said shaft, whereby said quantity of magnetic fluid retained along said inner face of said ring is in continuous, integrated fluid-to-fluid engagement with said first film of magnetic fluid throughout the travel of said relative movement.

9. A magnetic fluid seal apparatus according to claim 8, wherein said second pole piece is fixed around said shaft for hermetically sealing engagement therewith, and wherein said apparatus further comprises; an annular, magnetically permeable, second ring fixed within said housing for hermetically sealing engagement therewith, said second ring having a cylindrical inner face closely facing in a noncontacting relationship with said outer face of said second pole piece to form therebetween a small second radial magnetic gap forming part of the magnetic flux path generated by said magnetic element, said inner face of said second ring having an axial length smaller than that of said outer face of said second pole piece, and, a second magnetic fluid retained magnetically in said second radial gap to provide a second hermetic seal between said outer face of said second pole piece and said inner face of said second ring, a quantity of said second magnetic fluid being retained along said inner face of said second ring, the remainder of said second magnetic fluid being positively retained along said outer face of said second pole piece to form a second film of magnetic fluid throughout the axial length of said outer face of said second pole piece, said outer face of said second pole piece having an axial length equal to or greater than the travel of linear relative movement between said housing and said shaft.

* * * * *